Feb. 8, 1938. E. W. MILLER 2,107,543
PLURAL GEAR SHAPING MACHINE
Filed July 27 1934 14 Sheets-Sheet 2
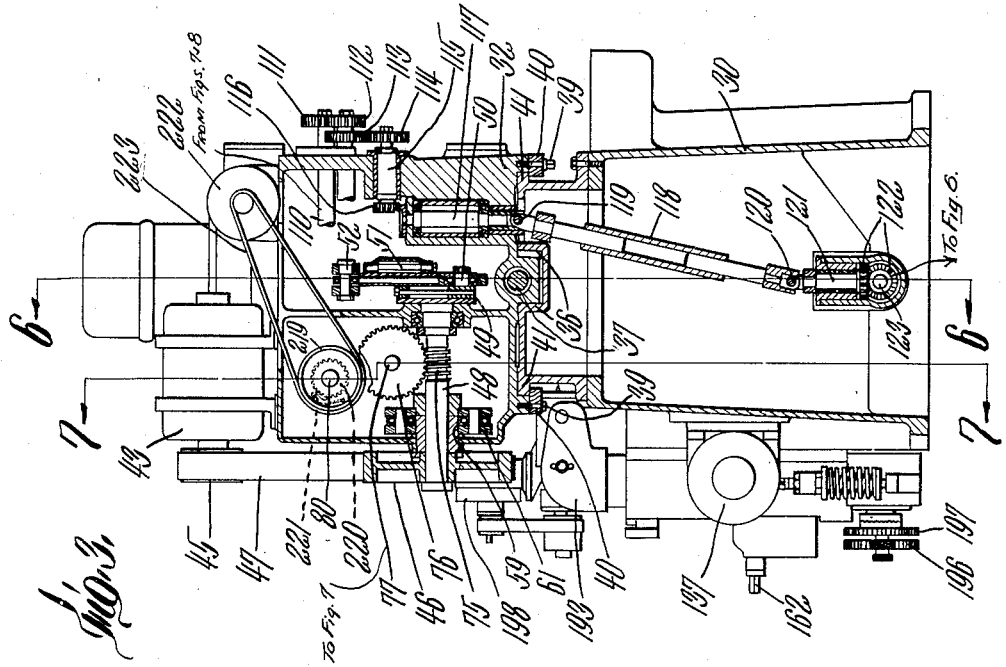
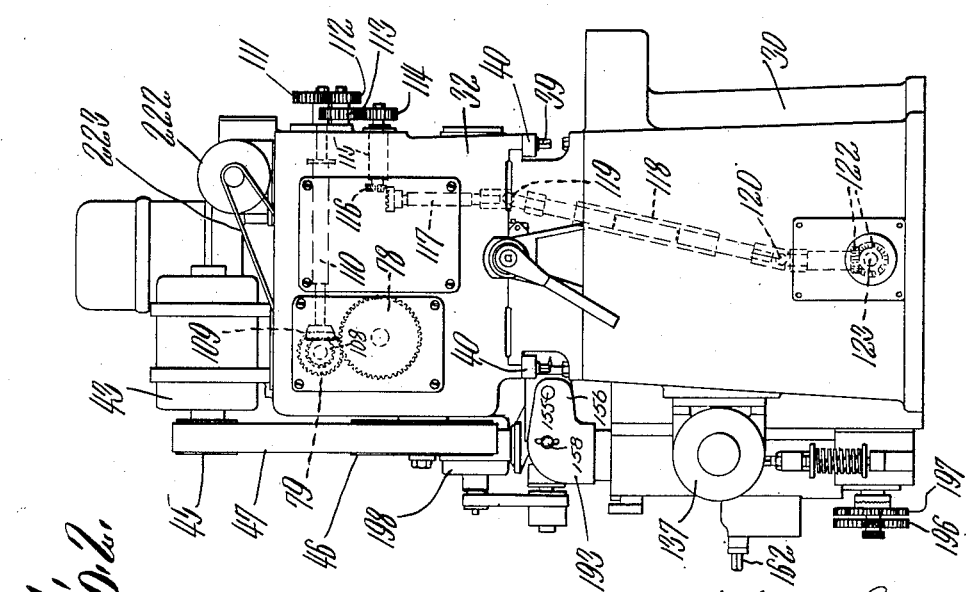
Inventor
Edward W. Miller
by Wight, Brown, Quinby & May
Attys

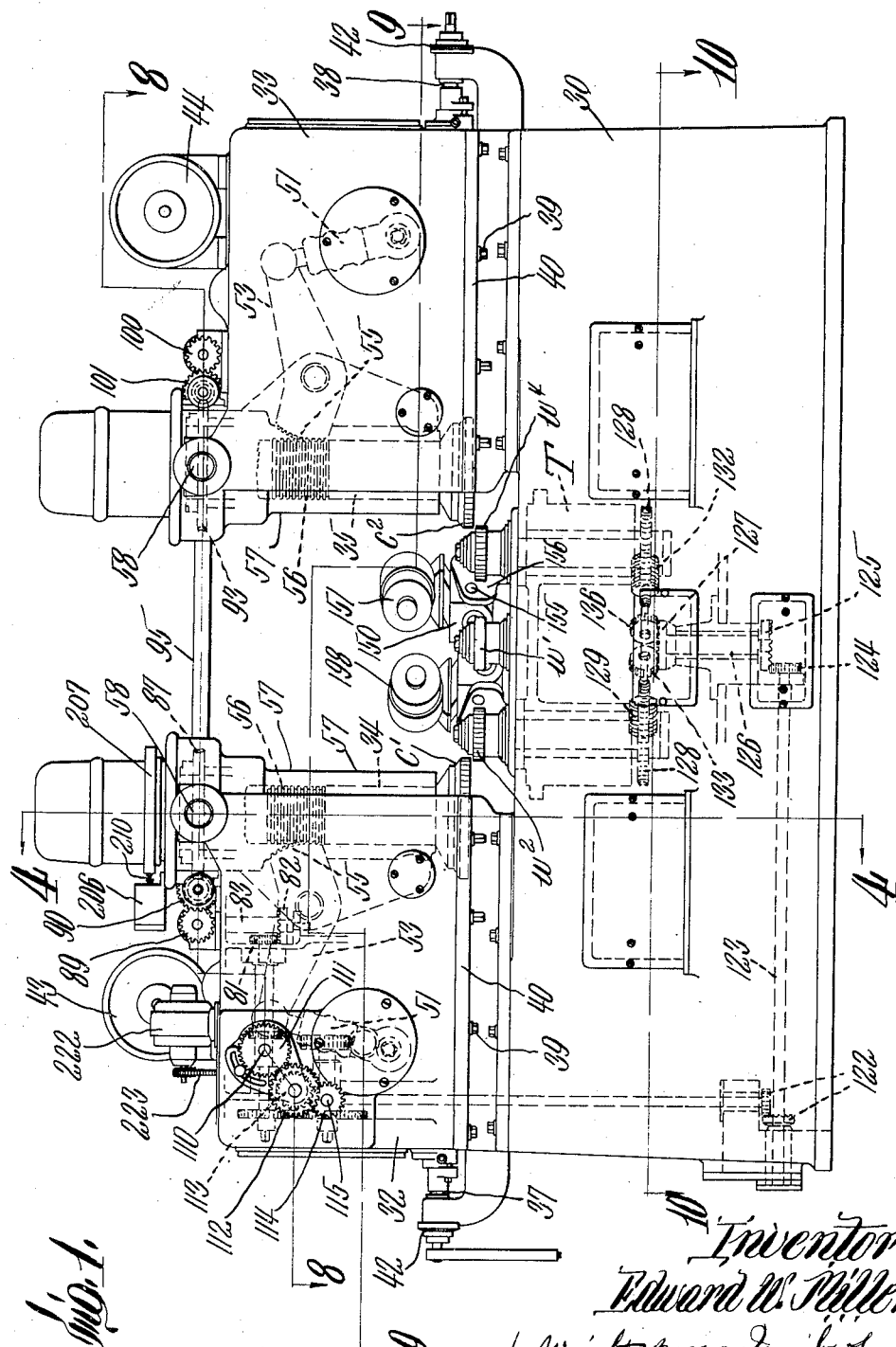

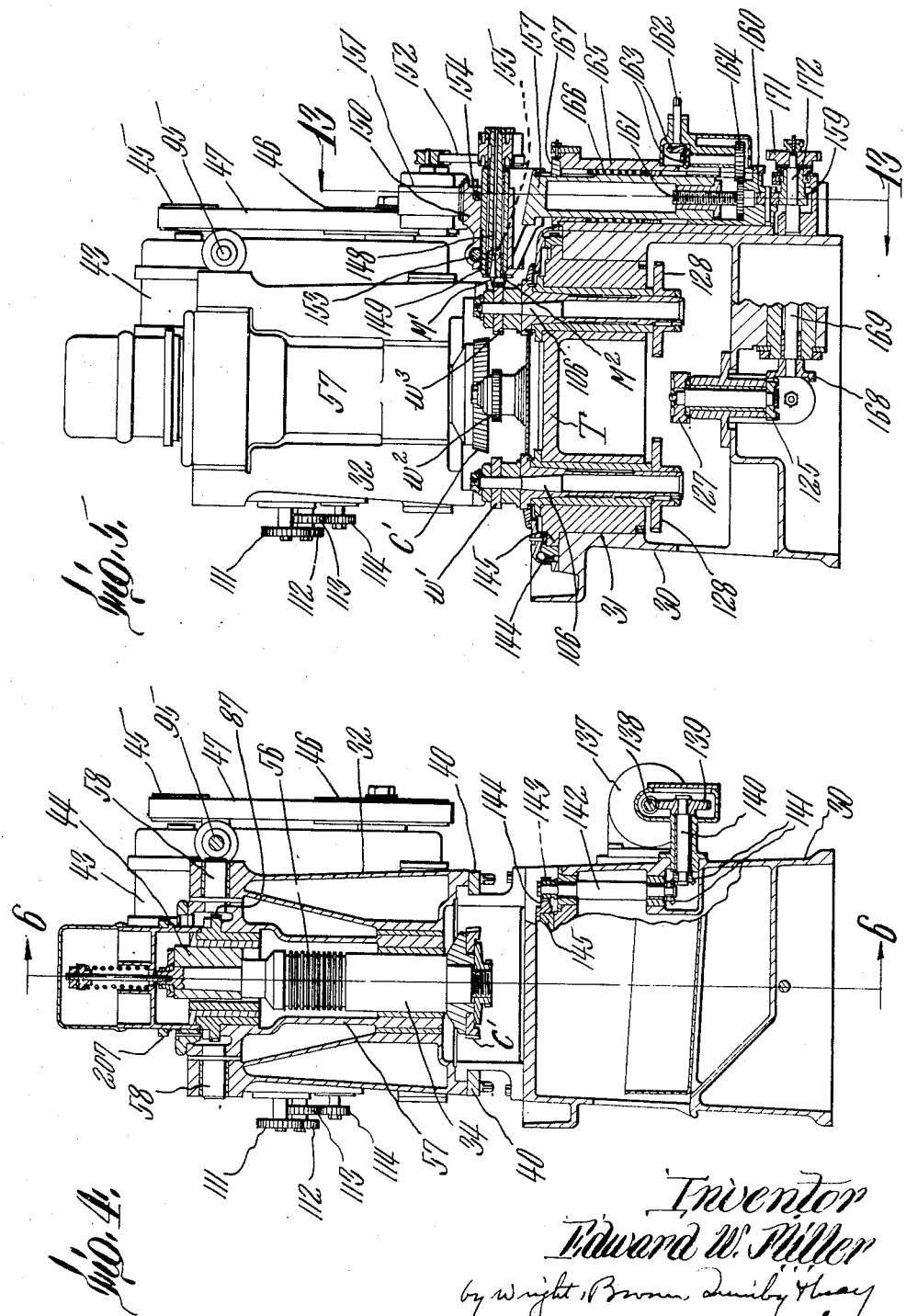

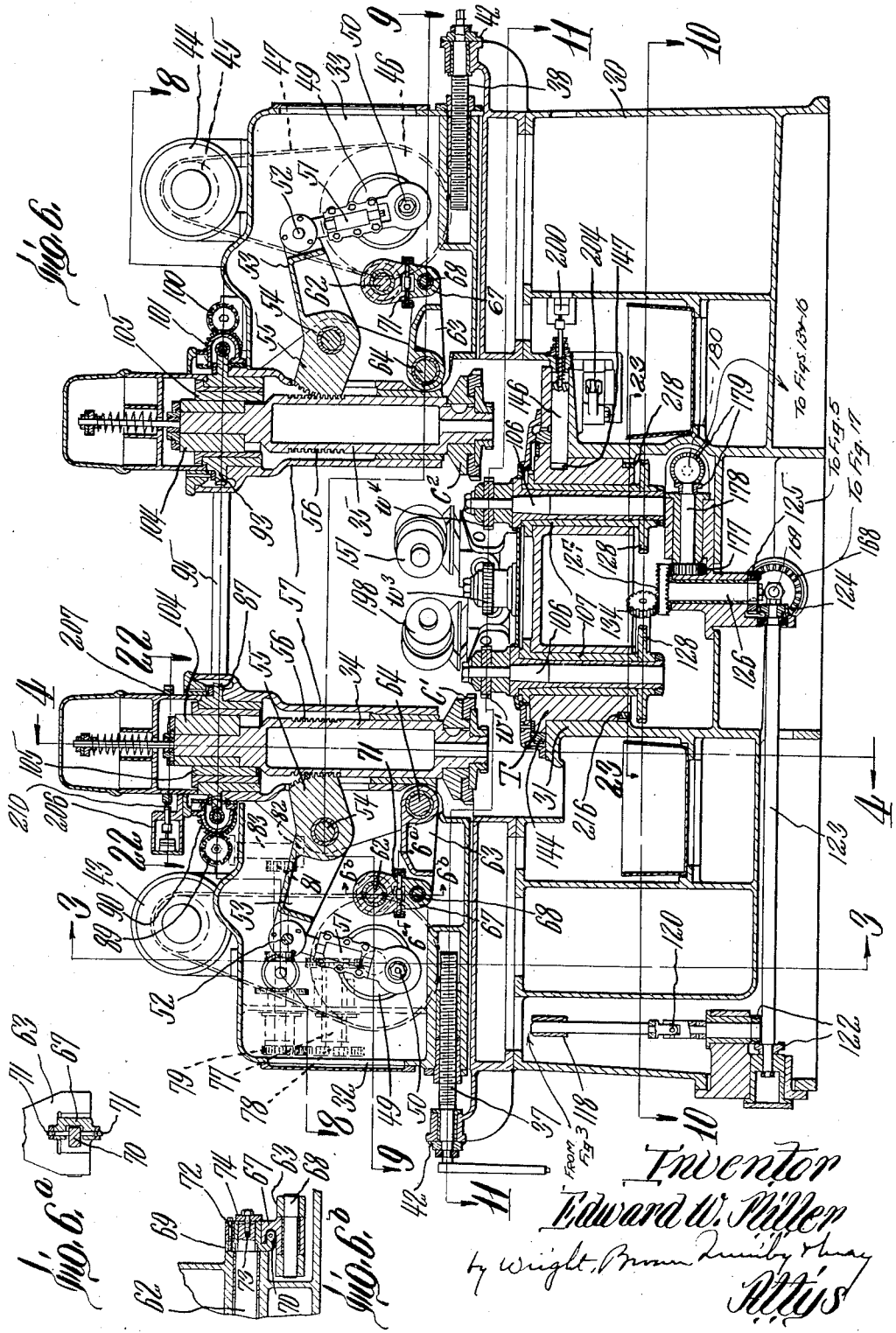

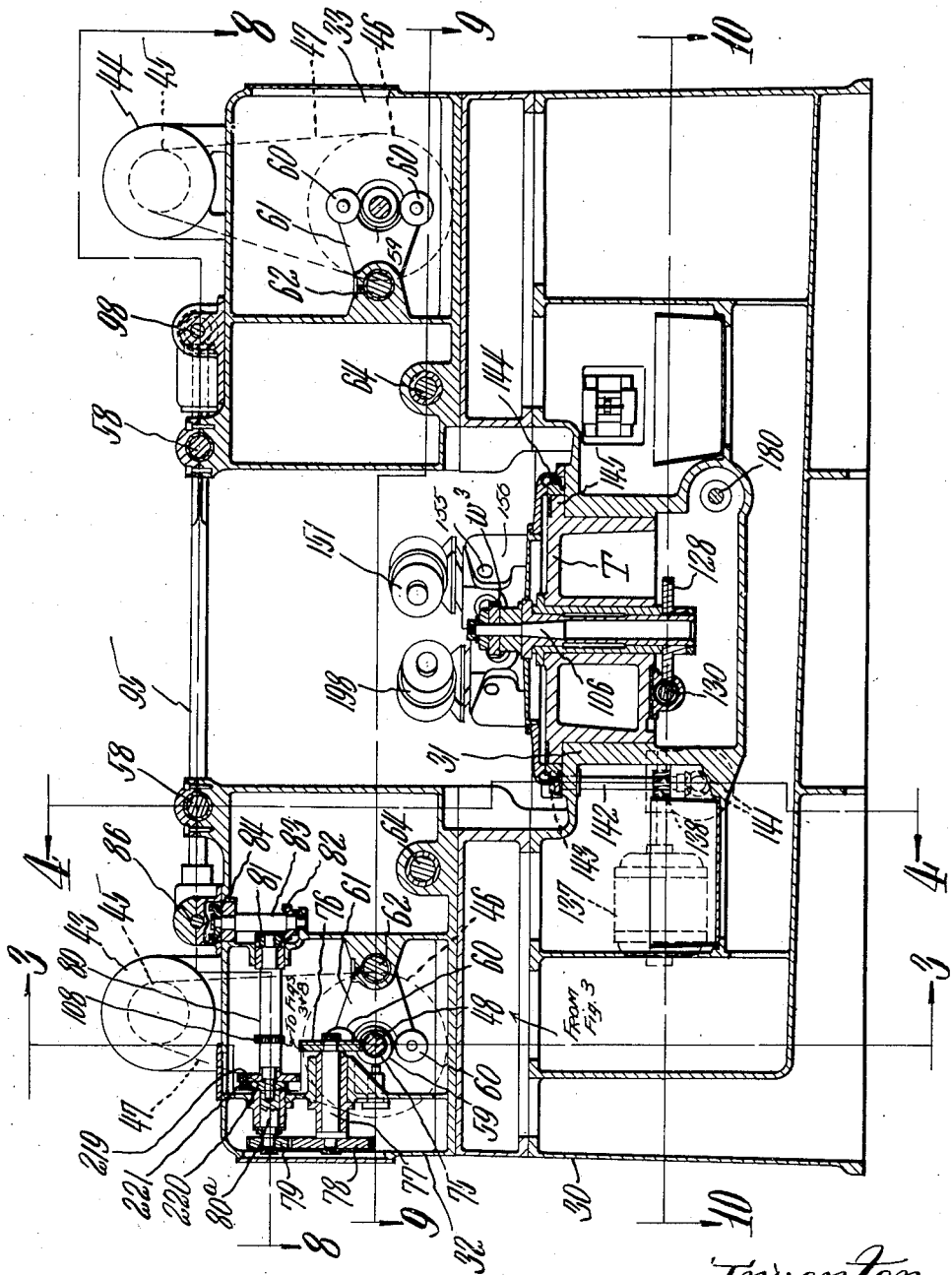

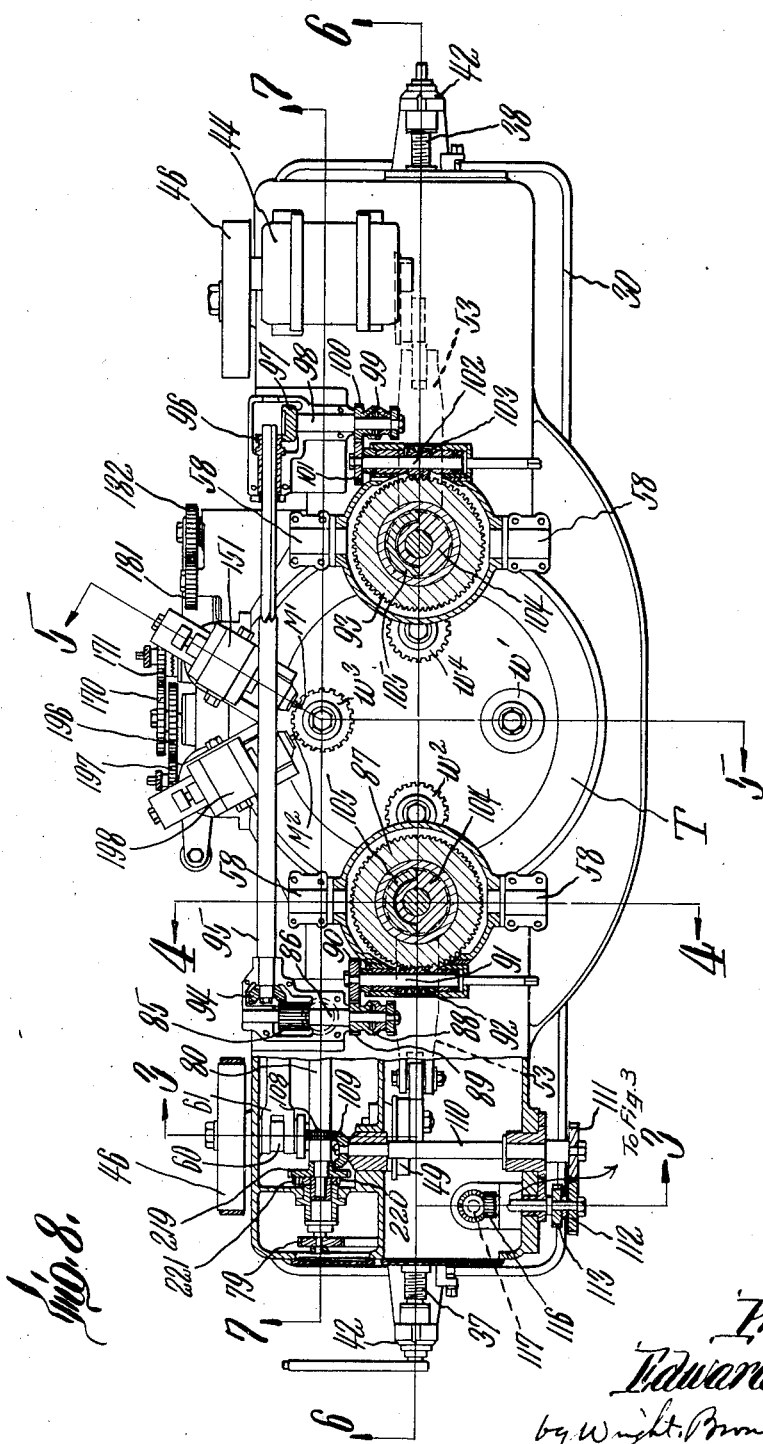

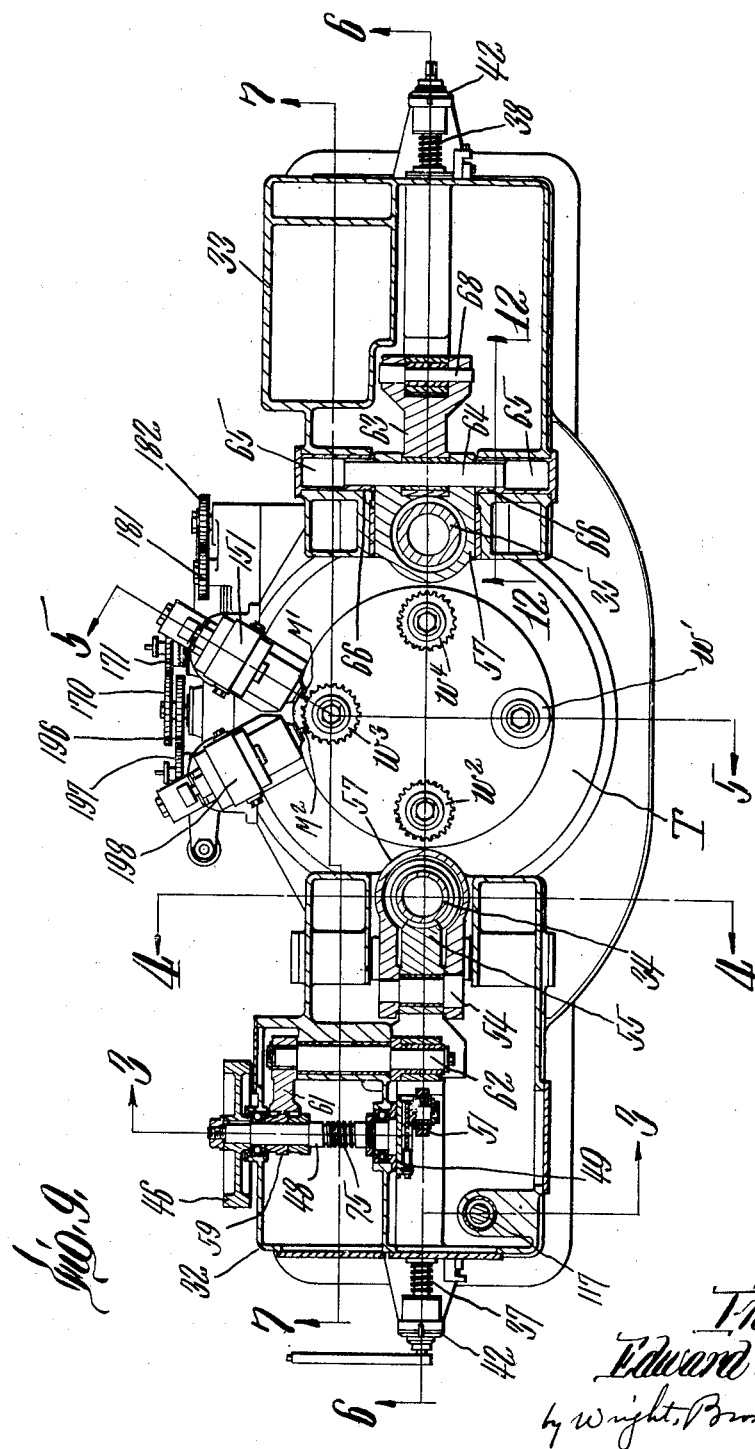

Feb. 8, 1938.  E. W. MILLER  2,107,543
PLURAL GEAR SHAPING MACHINE
Filed July 27 1934   14 Sheets-Sheet 8
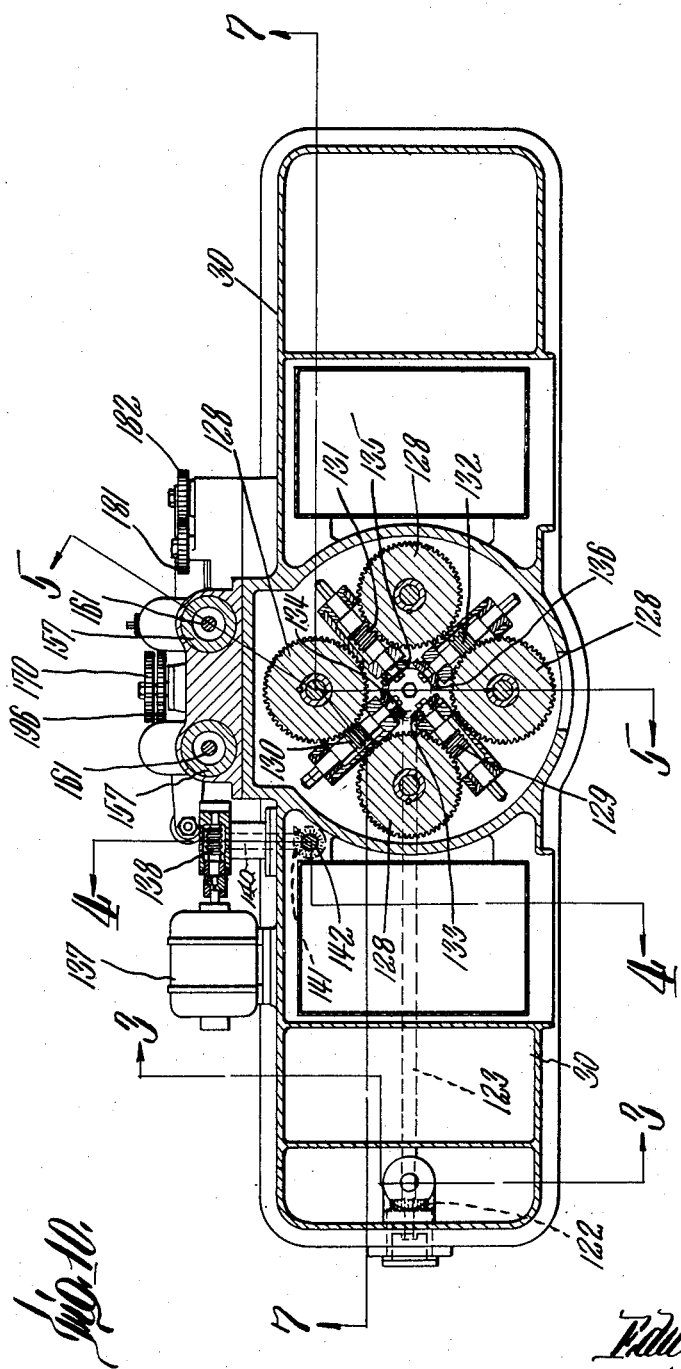
Inventor
Edward W. Miller Feb. 8, 1938.  E. W. MILLER  2,107,543
PLURAL GEAR SHAPING MACHINE
Filed July 27 1934   14 Sheets—Sheet 9
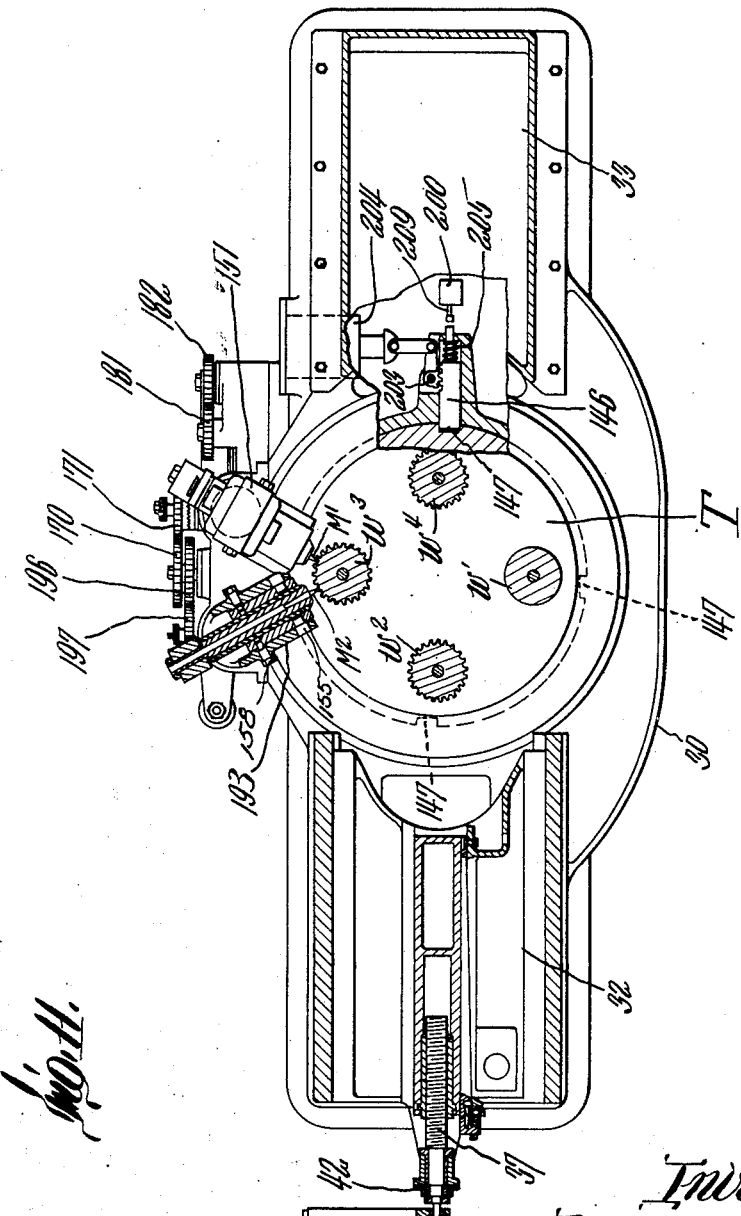

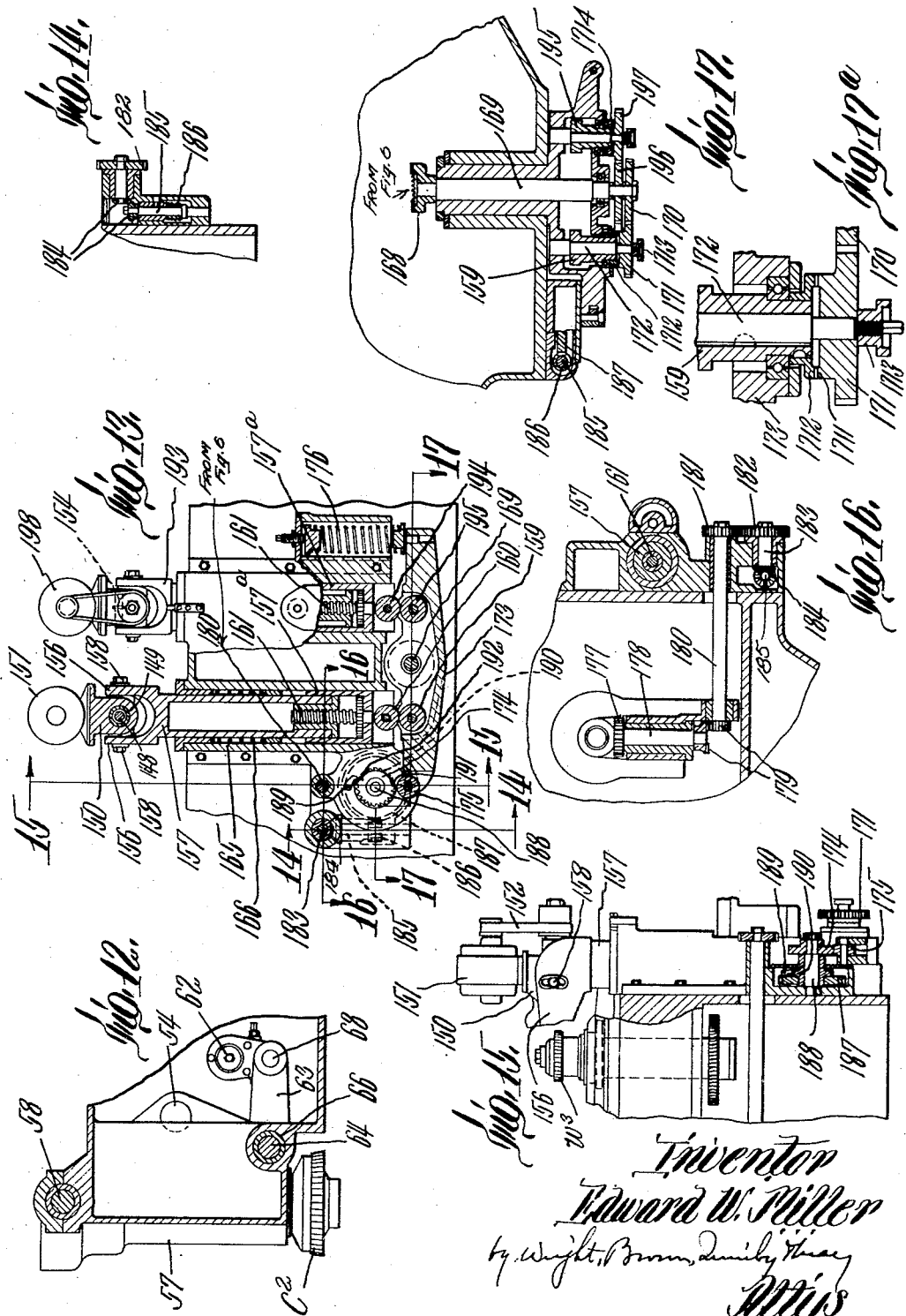

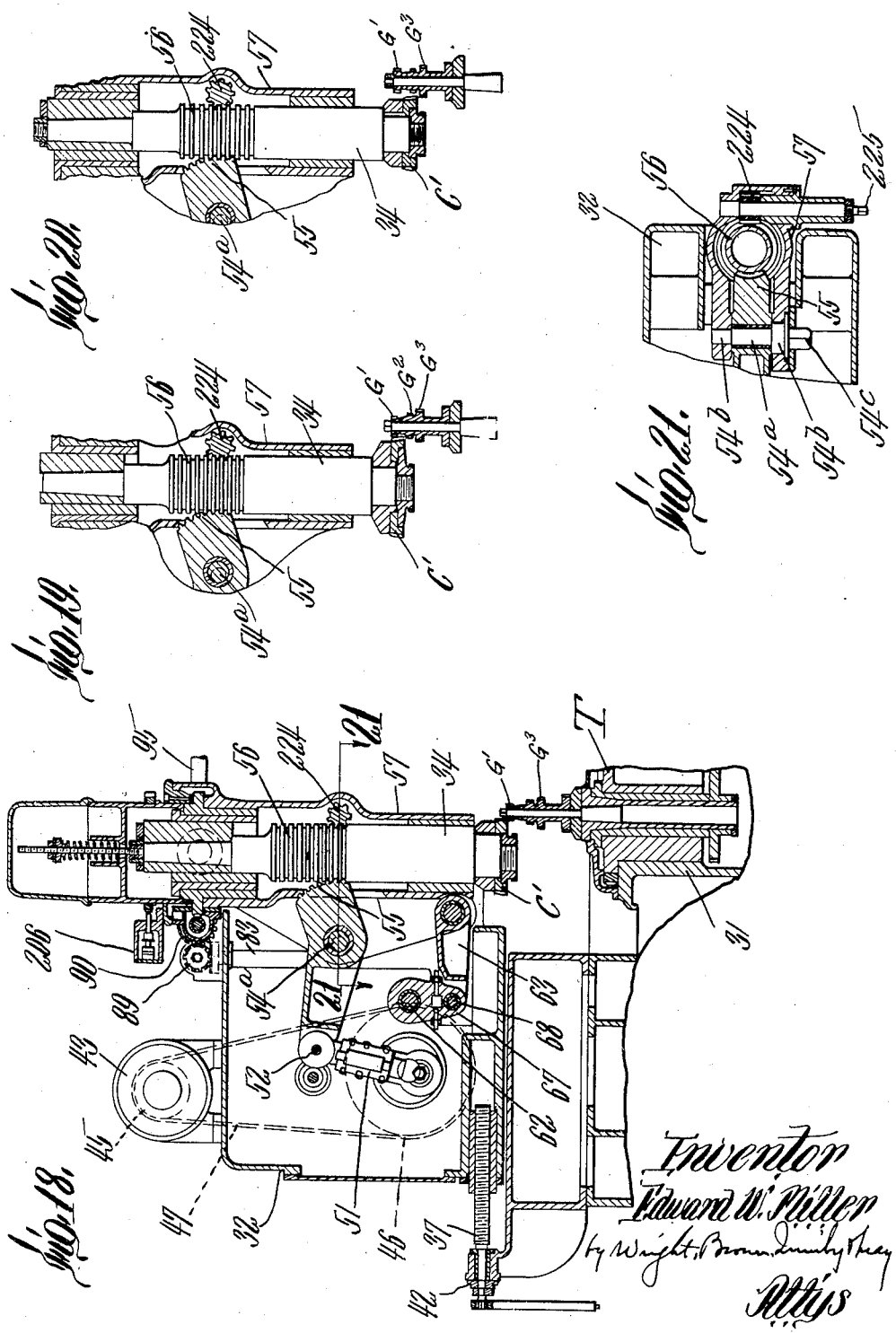

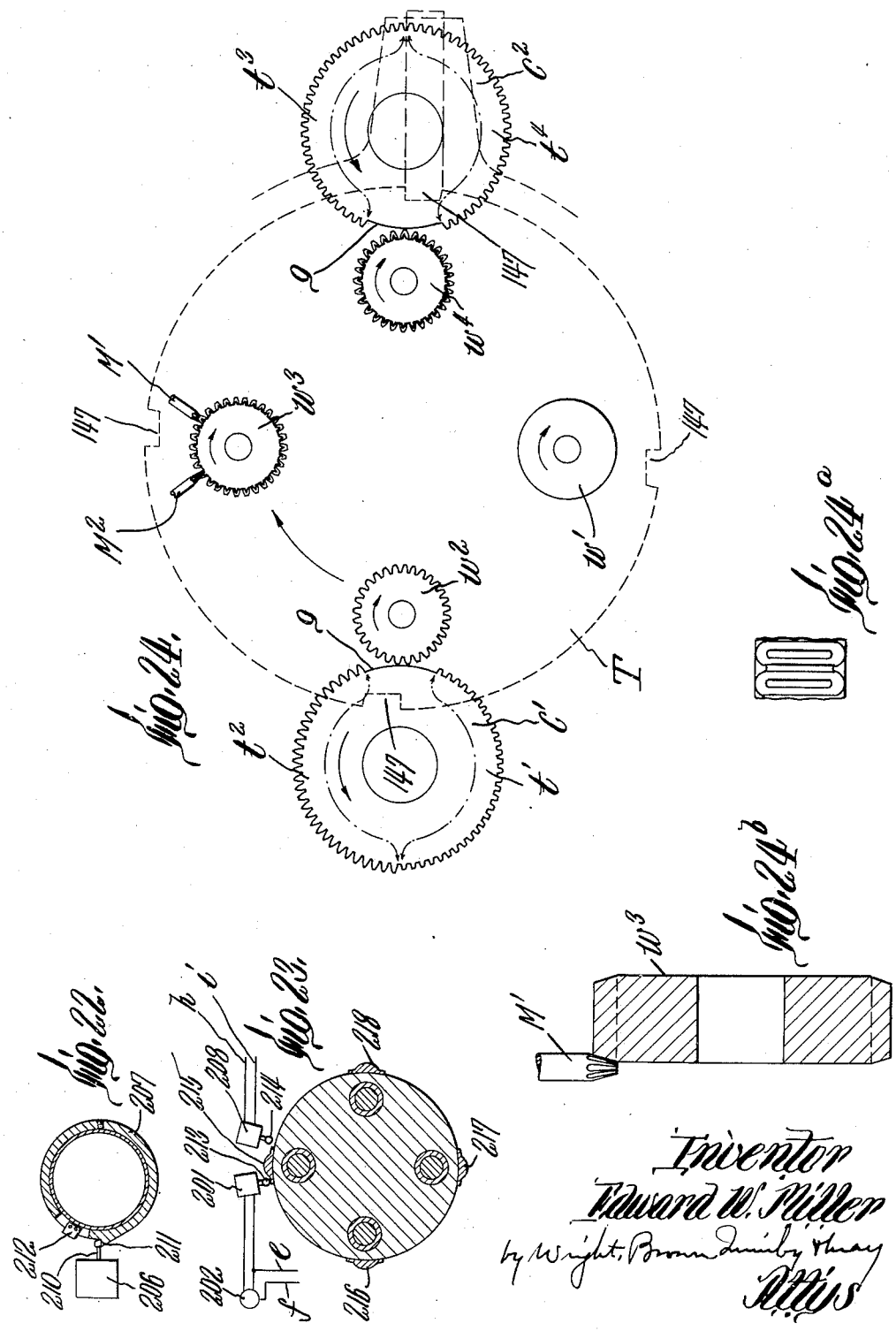

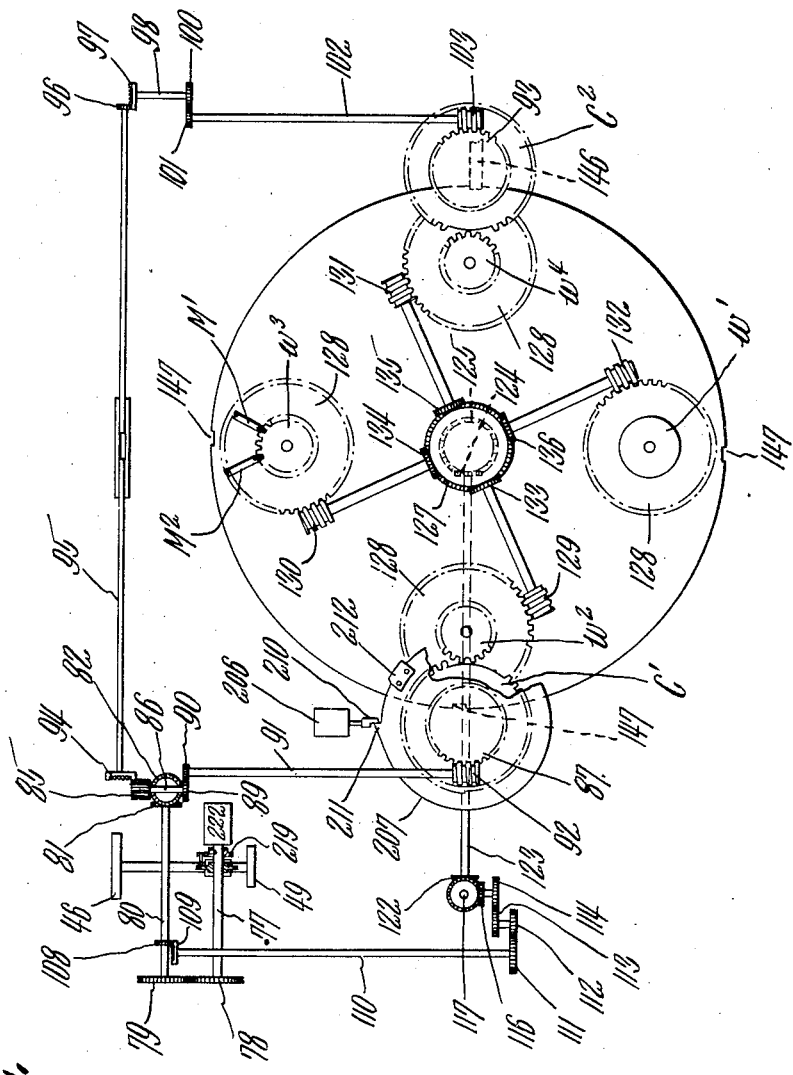

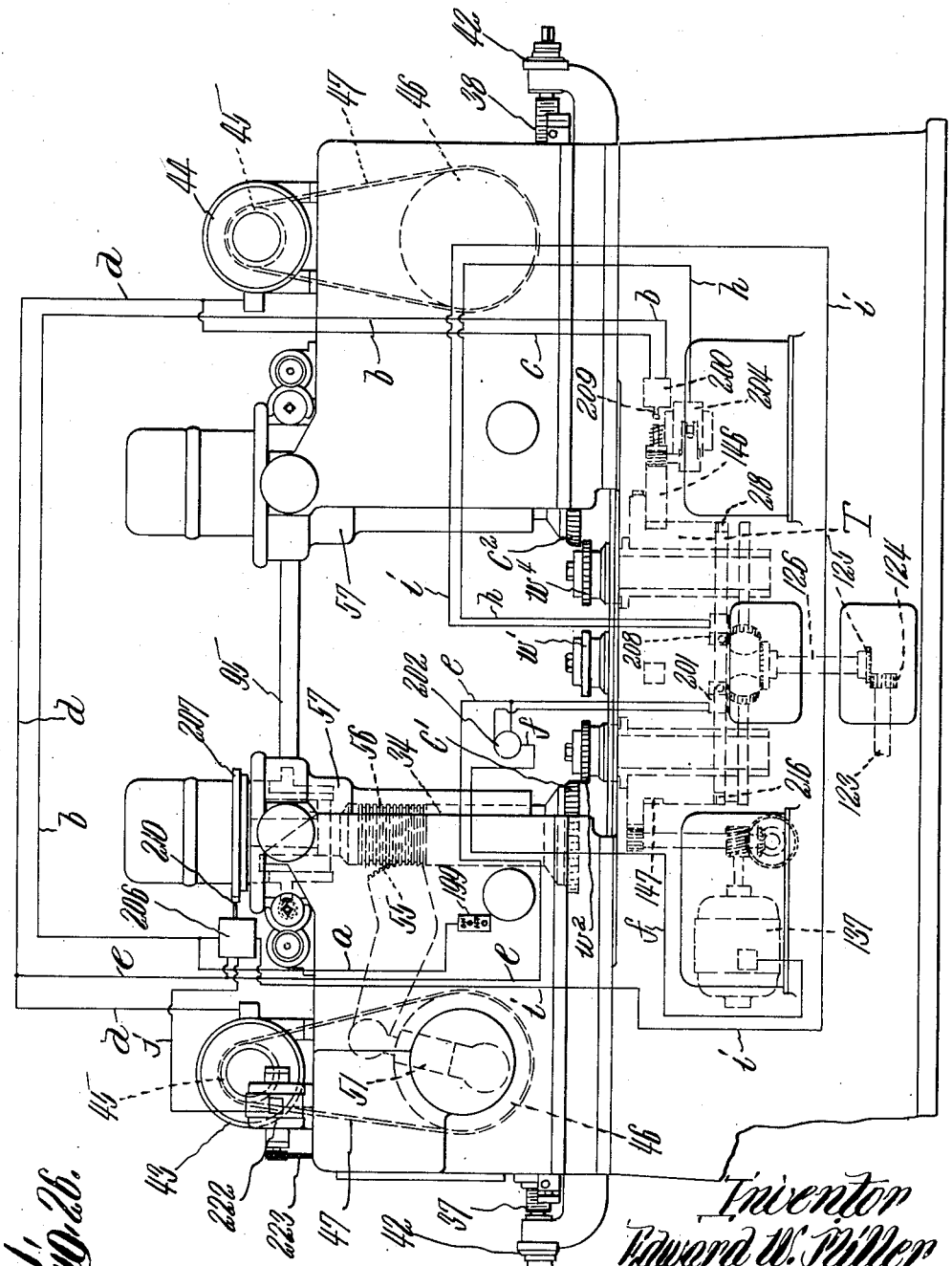

Patented Feb. 8, 1938

2,107,543

UNITED STATES PATENT OFFICE 2,107,543

PLURAL GEAR SHAPING MACHINE

Edward W. Miller, Springfield, Vt., assignor to The Fellows Gear Shaper Company, Springfield, Vt., a corporation of Vermont Application July 27, 1934, Serial No. 737,172

46 Claims. (Cl. 90—9)

The present invention relates to gear generating machines of the type in which a shaping cutter having teeth arranged similarly to the teeth of a gear, with cutting edges on their ends, is reciprocated axially across the rim of a gear blank, while both the cutter and blank are rotated about their respective axes at relative speeds corresponding to those of intermeshing gears of the same pitch diameters as the cutter and work piece respectively.

The objects of the machine are to perform a series of cutting actions, (i. e., so called roughing cuts and finishing cuts) on a number of gear blanks simultaneously and on each blank successively, without intermediate handling; to round off or bevel the ends of the teeth cut in the work pieces at one or both ends in the course of a progressive cycle; to eliminate depth feeding mechanism, and otherwise make the machine relatively simple; to eliminate looseness and make the machine as rigid as possible; and to effect other improvements, the nature and particulars of which are described in the following specification and pointed out in the claims.

As embodied in practical form, the invention comprises two or more cutter spindles each carrying a gear shaper cutter, and a plurality of work spindles mounted in a rotatable turret so as to be placeable in turn in cutting relation with each of the cutters. Either or all of the cutters on the cutter spindles may be designed to perform a succession of cuts in the course of two or more rotations of the work; that is, may cut to a given depth and width in the work piece during one rotation of the latter, and to a greater depth and/or width in a subsequent rotation. A milling cutter for rounding the ends of the teeth at one end of the work piece, or two such cutters for simultaneously rounding opposite ends of the work piece teeth, is or are mounted adjacent to one of the stopping locations of the work spindles and are caused to perform their function while the shaping cutter or cutters at other stations are in action. With the foregoing are combined necessary operating mechanism and control means, which include novel inventions. A further feature of the invention is its capacity for shifting the position of the cutter spindle or spindles lengthwise relative to the mechanism for reciprocating them, so as to act upon different zones axially separated from one another on the axis of the work piece; so as, for instance, to cut the different units of cluster gears such as are used in changeable speed transmission gearing for automobiles and other machines. A machine containing the features above mentioned, as well as numerous other novel and useful improvements, and illustrating the generic characteristics of the invention with reference to a specific embodiment, is described in the following specification and illustrated in the drawings.

In the drawings,—

Fig. 1 is a front elevation of the particular machine referred to;

Fig. 2 is an end elevation of the machine;

Fig. 3 is a vertical cross section on the line 3—3 of Figs. 6, 7, 8, 9, and 10;

Fig. 4 is a vertical cross section on line 4—4 of Figs. 1, 6, 7, 8, 9, and 10;

Fig. 5 is a vertical cross section on line 5—5 of Figs. 8, 9, and 10;

Fig. 6 is a longitudinal section on line 6—6 of Figs. 3, 4, 8, and 9;

Figs. 6a and 6b are detail sectional views taken on lines 6a—6a and 6b—6b respectively of Fig. 6;

Fig. 7 is a longitudinal section on line 7—7 of Figs. 3, 8, 9, and 10;

Fig. 8 is a horizontal section and partial plan taken on line 8—8 of Figs. 1, 6, and 7;

Fig. 9 is a horizontal section on line 9—9 of Figs. 1, 6, and 7;

Fig. 10 is a horizontal section on line 10—10 of Figs. 1, 6, and 7;

Fig. 11 is a horizontal section on line 11—11 of Fig. 6;

Fig. 12 is a detail vertical section on line 12—12 of Fig. 9;

Fig. 13 is a detail sectional view on line 13—13 of Fig. 5;

Fig. 14 is a sectional detail on line 14—14 of Fig. 13;

Fig. 15 is a sectional elevation on line 15—15 of Fig. 13;

Fig. 16 is a horizontal fragmentary section taken on line 16—16 of Fig. 13;

Fig. 17 is a horizontal section on line 17—17 of Fig. 13;

Fig. 17a is an enlarged view of a detail of Fig. 17;

Fig. 18 is a partial section similar to Fig. 6 showing means for adjusting the cutter spindle lengthwise relatively to the reciprocating mechanism;

Figs. 19 and 20 are fragmentary views of the same spindle showing its adjustment into position for operating on different zones of the work piece;

Fig. 21 is a horizontal detail section on line 21—21 of Fig. 18;

Fig. 22 is a view of the timing cam and electrical interlock controlled thereby taken in horizontal section on line 22—22 of Fig. 6;

Fig. 23 is a detail horizontal section taken on line 23—23 of Fig. 6 showing the timing relay;

Fig. 24 is a diagrammatic plan view illustrating the character of work performed by this machine and the cutters for doing it;

Figs. 24a and 24b are detail views illustrating the effect of the tooth rounding cutters;

Fig. 25 is diagrammatic plan view of the operating means for temporarily accelerating the rotation of the cutters; and Fig. 26 is a diagram showing the electrical means by which the machine and the automatic sequence of its operation are controlled.

Like reference characters designate the same parts wherever they occur in all the figures.

Reference is directed first to Fig. 24 to show the character of work performed by the machine. In this illustrative machine there are four work pieces designated respectively as $W'$, $W^2$, $W^3$ and $W^4$, which are mounted rotatably and carried revolubly by a turret T successively into coaction with a cutter $C'$, which may be called for convenience a roughing cutter, and a second cutter $C^2$ which may be called a finishing cutter. The turret rotates step by step and has a number of stopping positions equal to the number of work pieces carried by it. The position of the work piece $W'$ is the loading position, where blanks are applied to work spindles and finished gears removed from them. The cutters $C'$ and $C^2$, which are of the well known Fellows gear shaping cutter type, are located beside two other stopping positions of the work pieces, preferably at diametrically opposite sides of the turret axis, for convenience in design of the machine, but not of necessity otherwise.

The roughing cutter here shown is designed to take two cuts, or series of cuts, all around the work. Therefore it is provided with a first series of teeth $t'$, equal at least in number to the teeth to be produced in the work, but of substantially less width and depth than the prescribed finished tooth space dimensions of the work piece. The same cutter is provided with a second series of teeth $t^2$, also equal at least in number to the teeth of the work piece, adapted to perform a second roughing cut while the work piece is turned through a second rotation in the position $W^2$. The teeth $t^2$ are wider than teeth $t'$, but narrower than the finished width of the tooth spaces in the work piece. They are also longer or deeper than the teeth $t'$; and may be even longer than the teeth of the finishing cutter, in order to cut to such depth in the work as to avoid contact of the points of the finishing cutter teeth with the root circumference of the work. Of course the teeth $t'$ and $t^2$ have the same spacing on the pitch circumference of the cutter as the teeth to be produced in the work. Hence the diameter of the cutter is at least twice as great as the diameter of the gear blank. Actually it is larger than this by an amount sufficient to leave a gap $g$ at one side of the cutter, where there are no teeth; such gap being long enough to permit the work to arrive at and leave the cutting station without interfering with the cutter teeth. This is an item of much importance, as it avoids necessity for any translative depth feed of the cutter and enables the cutter teeth to enter gradually to their full depth in the work by rotation alone. Suitable means are provided for correlating the rotation of the cutter with the rotative steps of the turret so that the gap $g$ is brought beside the work piece station when the turret is indexed.

The finishing cutter also has two series of teeth, designated as $t^3$ and $t^4$ respectively which successively semi-finish and fully finish the work piece when the latter is put in the position of $W^4$. There is preferably a slight difference in width between the teeth of these two series, enough to leave a very small amount of stock (such as, for instance, four thousandths of an inch distributed between the two sides of the work piece teeth) to be removed by the teeth $t^4$. It is to be understood of course that these teeth also have the same pitch as those to be generated in the work; hence the same as in the roughing cutter. There is likewise a gap $g$ in the finishing cutter, at one side between the two sets or series of teeth, which is brought beside the work station $W^4$ when the work comes into and leaves that station.

The stopping location $W^3$ between the roughing and finishing positions of the work is utilized for rounding or chamfering the ends of the teeth. For performing this operation I have provided two tapered milling cutters shown at $M'$ and $M^2$; one for each end of the work piece. These cutters have teeth in a conical arrangement and are designed to rotate about the axis of the cone. The end which is thus toothed is so narrow that it may enter between contiguous teeth of the gear without contact, or with only grazing contact. These cutters are given a movement axially of the gear, back and forth in the time required for the gear to rotate through the angular spacing of one tooth, whereby each cutter is caused to bevel the adjacent end of each gear tooth, as shown in Fig. 24b, and to cut away the angles between the end and sides of each tooth with a convex curvature, as shown by Fig. 24a. The milling cutters may be adjusted to bring their axes either perpendicular to the axis of the gear, or at an inclination to either side of such perpendicular, whereby to vary the angle of bevel.

The particulars of the machine here illustrated for performing the actions thus generally described are as follows. A base structure 30 contains in its middle portion a bearing 31 (Fig. 6) in which the turret T is rotatably mounted. Beds or slides 32 and 33 carrying the spindles 34 and 35 for the cutters $C'$ and $C^2$ respectively are mounted on top of the base at opposite sides of the turret and are guided in ways 36 (Fig. 3) which are diametrally arranged with respect to the turret. Screws 37 and 38 are rotatably mounted in brackets at opposite ends of the base and are in threaded engagement with the respective beds, so that when rotated by a wrench applied to their outer ends, they may bring the cutters into correct relation to the work, and adjust cutters of different diameters to work pieces of different diameters. Inasmuch as this machine has no depth feed, this radial adjustment of the beds is operated only when a cutter needs readjustment after sharpening, or different cutters or different sizes of work piece are substituted for one another. But so long as no change is made in these conditions, the beds are clamped removably by means of screws 39 (Figs. 1 and 3) which enter tapped holes in the under side of the bed adjacent their opposite edges and force gibs 40 up against the under side of flanges 41 on the base on which the beds rest. This makes a very rigid mounting for the beds, preventing them from being raised or displaced by the reaction of the cutters, particularly the roughing cutter, in traversing the work piece. A graduated collar 42 is secured to the exposed part of each screw for assistance in accurately locating the cutter.

The two cutter spindles are independently reciprocated by separate electric motors 43 and 44 respectively. As both spindles and their motors are alike, the following description applies to both, and their corresponding parts are designated by the same reference characters. The motor rotates, by means of sprockets 45, 46 and a link belt 47 (or equivalent gearing) a shaft 48 (Fig. 7), on which is secured a crank disk 49. The latter oscillates, by means of a radially adjustable crank pin 50, extensible connecting rod 51, and wrist pin 52, of known character, a lever 53 which turns about a pivot stud 54 and one arm of which is a gear segment 55 meshing with encircling rack teeth 56 on the spindle.

Each cutter is backed off after each cutting stroke so as to clear the work on its return strokes, and is advanced again to cutting position before the next cutting stroke. To provide for these motions, the cutter spindle is mounted, not directly in its supporting bed or slide, but in a saddle 57 which is pivoted to the bed by trunnions 58, the axis of which is transverse both to the axis of the spindle and to the line of centers between the cutter and work piece in adjacent cutting location, and the distance of which from the cutter is great enough to afford substantial linear displacement of the cutter with slight or inappreciable angular movement of the saddle. Shaft 48 carries a cam 59 (Fig. 7) which is engaged at opposite sides of its axis by rollers 60 on the branches of a forked lever arm 61. This arm is secured to a rock shaft 62 which is coupled by an adjustable arm (later described), a connecting rod 63, and pin 64 (Fig. 6) with the saddle.

Pin 64 is not only a coupling, but it is also a stop member for rigidly locating the cutter in its cutting position. For that purpose it is made as a massive rigid bar, the ends of which protrude from opposite sides of the saddle and enter bushings 65 (Fig. 9) mounted in adjacent flanking portions of the bed. The interior of each bushing is wider than the entering end of the stop bar, and on the side toward the work spindle the bushing is formed with an abutment 66 against which the side of the stop bar is pressed and firmly held by the cam and linkage just described.

The adjustable arm above referred to is shown in detail in Figs. 6a and 6b. It comprises an arm 67 coupled to the connecting rod 63 by a pin 68, and a collar 69 keyed to rock shaft 62 and having a sleeve portion on which the hub part of arm 67 is rotatably mounted. An offset projection 70 extends from collar 69 into a recess in the adjacent part of arm 72 and is engaged on opposite sides by the ends of two alined adjusting screws which pass through the walls of the recess and are accessible at their outer ends for adjustment. This recess is enough wider than the projection 70 to permit shifting of the arm 70 by the adjusting screws angularly around the axis of shaft 62 to an adequate extent. The screw 72 shown in Fig. 6b is a clamp screw which passes through a slot or hole, wider than its own diameter circumferentially of the shaft, in the hub of arm 67 and is threaded into a tapped hole in the collar 69 to retain the arm against the collar. A screw 73 and washer 74 retain the collar on the shaft.

The points at which the lever arms 61 and 67 are connected to the rock shaft 62 are separated from one another by a considerable distance lengthwise of the shaft. Thus the shaft is a torque element through which the cam 59 transmits force to the cutter saddle in holding the cutter in its cutting position. It is put under torsional stress and acts as a stiff torsion spring to transmit the thrust of the cam and to yield when the cam imparts movement to the receiving arm 61 after the stop member 64 has been brought into contact with the abutment bushings 65. Adjustment of the arm 67 enables the saddle to be brought to its arrested cutting position before the throw of the cam has been totally expended; while the torsion spring effect of the rock shaft insures firm pressure of the saddle stop against its abutment and prevents the transmitted forces and reactions from being excessive.

Cam 59 is formed with a short rise, an opposite short descent, and intermediate high and low dwells properly arranged and timed with respect to the crank pin 50 so as to shift the cutter back and forth at or near the ends of its strokes in opposite directions, and to retain it in the cutting path during the cutting strokes. It is to be noted that the pivot 54 of the spindle reciprocating lever is mounted in parallel webs of the saddle and moves with the latter, wherefore the backing off movement involves no change in the mesh between segment 55 and rack 56.

Rotation is imparted to both cutter spindles in unison from the main shaft, or crank shaft, 48. The gear train for this purpose is shown in Fig. 7, and partly in Fig. 3. A worm 75 on shaft 48 drives a gear 76 on shaft 77, which is coupled by change gears 78, 79, and an overrunning clutch (later described) with a shaft 80. A pinion 81 on shaft 80 drives a crown gear 82 on an upright shaft 83, and the latter carries a crown gear 84 in mesh with a wide faced spur gear 85 on a transverse shaft 86 (see also Fig. 8). Pinion 85 drives a worm gear 87, surrounding cutter spindle 34, through the said shaft 86, a clutch 88, gears 89, 90, shaft 91 and worm 92 on shaft 91 in mesh with this worm gear. Pinion 85 also rotates simultaneously a worm gear 93 surrounding cutter spindle 35, by means of a crown gear 94, shaft 95, pinion 96, crown gear 97, shaft 98, clutch 99, gears 100 and 101, shaft 102, and worm 103, the train from 97 to 103 being substantially identical with that from 85 to 92. Rotation is transmitted from worm gears 87 and 93 to their respective spindles through complemental guide members 104 and 105, one of which is fixed to the spindle and is slidable endwise relatively to the other, fixed to the gear. They are alike for both spindles and are of well known character. When the machine is set up for cutting straight spur gears, the contact faces of these guides are straight and parallel to the spindle axis; and for cutting helical gears their contact faces are helical to a degree proportional to the helix angle of the teeth to be cut, and the cutter has complementally helical teeth.

The common rotational drive for both cutter spindles causes them to rotate in unison and is of advantage from the point of view of simplicity, inasmuch as a single changeable speed transmission gearing suffices for both spindles. At the same time each spindle is rotatably adjustable independently of the other with the aid of the clutches 88 and 99, disconnection of which releases the gear 89, and correspondingly gear 100, from its shaft, allowing the worm 92, and correspondingly the worm 103, to be turned manually by a wrench applied to the extension of the worm shaft.

Work spindles 106, four in number in the present illustration, and all alike, are mounted in the turret T with their axes equidistant from, and equiangularly spaced around, the axis of the turret. These spindles rotate in bushings 107 set into the turret. As shown, they are parallel to one another, to the turret axis, and to the cutter spindles. They are rotated simultaneously and in unison by gearing which comprises the shaft 80 previously mentioned, a pinion 108 thereon, a crown gear 109 on a transverse shaft 110 (Fig. 8), change gears 111, 112, 113, 114, shaft 115, pinion and crown gear couple 116, upright shaft 117, telescopic shaft 118 coupled by universal joint 119 with shaft 117, and by universal joint 120 with shaft 121 at the base of the machine, pinion and crown gear pair 122, longitudinal shaft 123, pinion 124, crown gear 125 on the lower end of upright shaft 126 in the pivot axis of the turret, and crown gear 127 on the upper end of shaft 126. Each of the work spindles has a worm gear 128 keyed to its lower end which protrudes below the turret, and these worm gears are meshed respectively with worms 129, 130, 131 and 132, which are held with their axes all substantially radial to the turret axis. It will be understood from the drawings, without further description, that suitable housings are secured to the turret in which the shafts of these worms have their bearings, which housings maintain the worm shafts in the radial relationship described. Connected to the shafts of the several worms 129 etc. are pinions 133, 134, 135 and 136 respectively, all of which run in mesh with the crown gear 127. Thus all the spindles are turned in unison, and when the spindles are indexed by rotation of the turret, their angular relationship to one another is preserved by the constant mesh of their respective driving pinions with the common crown gear.

The turret is indexed by an electric motor 137, which may be of the type known as a torque motor, mounted on the rear side of the base with its armature shaft coupled to a worm 138 (Fig. 10). This worm meshes with a worm wheel 139 (Fig. 4) on a shaft 140 which is connected by a gear pair 141 with an upright shaft 142 carrying on its upper end a pinion 143 in mesh with gear teeth 144 formed on an annulus which surrounds an external flange 145 of the turret, which flange supports the turret by overlapping the rim of its bearing 31. A locking bolt 146 (Fig. 6) is mounted in the base to slide radially of the turret into one or another of the notches 147 (see also Fig. 11) in the circumference of the turret; these notches and the locking bolt being related to the spindles so as to locate the latter in proper relation to all the cutters at each stopping place.

Use of a torque motor for indexing the turret is of advantage in that, by keeping such motor in energized condition constantly (except during brief intervals for a special purpose later explained), it causes one side of the notch in which the locking bolt is entered to be pressed against the bolt, and causes the turret to start its indexing rotation as soon as the lock is withdrawn.

Rounding or beveling of the ends of gear teeth is practically necessary for all gears which are organized to slide axially into and out of mesh with companion gears, as, for instance, in automobile transmissions; and particularly so in the case of helical gears, of which one corner at each end is an acute angle. This machine is equipped with milling cutters for performing this operation at both ends of the work piece teeth, as described in the introductory part of this specification. Illustrative means for so operating the tooth rounding cutters are shown in Figs. 5 and 13—17a inclusive, to which attention is now directed. The cutter M' is organized to cut the upper ends of all the teeth. It is secured to, and projects from the end of, a spindle 148 which rotates in a sleeve 149 contained and slidable endwise in a head 150. An electric motor 151 mounted on the head rotates spindle 148 by means of a belt and pulley drive 152. The spindle is mounted substantially radial to the contiguous work piece and is adjustable endwise to gears of different diameters by a pinion 153 mounted rotatably in the head 150 so as to engage rack teeth cut in the side of slide 149 and move the latter endwise. A clamp 154 serves to lock the slide in any position. The head is also adjustable angularly about a horizontal axis near the tool location in order to determine the angle of bevel, for which purpose it is supported by alined trunnions 155 in flanking arms or webs 156 on the upper end of an upright slide 157. Clamp bolts 158 passing through slots in these webs and screwed into the contiguous sides of the head secure the adjustments.

Slide 157 operates in a guide 165 secured to the rear side of the base, and it is supported by a cam 159 which also gives it up and down movements in time with the rotation of the work spindle. It is made of two telescopic parts, 157 and 157a, the latter of which carries a follower roll 160 in contact with the cam and also supports a screw 161 threaded into the other part. This screw may be rotated by a wrench applied to the end of shaft 162 which acts through a gear pair 163 and a gear 164 secured to one of the members of such pair, as shown, to rotate a gear fixed to the screw, whereby to adjust the position of the tool longitudinally of the work piece axis to accommodate longer or shorter gears. Slide 157 is constantly forced toward the cam, not only by its weight, but also by a spring 166. A key 167 enters a keyway in the side of slide 157 to prevent lateral displacement of the rounding tool.

Cam 159 is rotated by spur teeth on the circumference of gear 125 of the work spindle driving train, through a crown gear 168, shaft 169, change gears 170, 171, and shaft 172. The cam is keyed to this shaft, and is adjustably clutched to change gear 171 through teeth 1711 on the adjacent end face of the latter, and complemental teeth on the face of a clutch disk 1712 which is tightly fitted and keyed to the hub of the cam. A clamp nut 1713 screwed on the threaded end of shaft 172 secures the gear in any angular adjustment. By suitable selection of change gears, and adjustment of the cam 159 with respect to gear 171, or vice versa, as permitted by the clutch 1712—1711, the tool may be caused to descend and rise while the work piece turns through the angle between the radial center lines of two teeth, and its motions timed to accord with the rotation of work pieces having different numbers of teeth more or less widely spaced apart.

The rounding tool is raised, or backed off, clear of the work when the turret is indexed, and for this purpose the cam 159 is lifted bodily. It is mounted in a lever 173 which turns about the axis of shaft 169 under control of a back off cam 174. One arm of said lever carries a follower roll 175, and its other arm is pressed upon by a spring 176 so as to hold the follower roll against the surface of the back off cam. This latter cam is driven by the crown gear 127 of the work spindle drive through a gear 177, which meshes with crown teeth on the under side of said crown gear (Fig. 6), a shaft 178, crown gear and pinion couple 179, shaft 180, change gears 181, 182, shaft 183, bevel gears 184, shaft 185, worm 186 on the last named shaft, and worm gear 187 loosely mounted on the shaft 188 of cam 174, to which it is coupled for one way driving by a pawl 189 and a ratchet or gear wheel 190. The pawl is carried by the worm wheel and the ratchet is keyed to cam shaft 188. This coupling permits independent adjustment of the cam, as a convenient means to time its action with that of the turret. A large part of the surface of this cam is a dwell, but it has a drop at 191 which causes the rounding tool to be quickly withdrawn from the work before indexing begins, and a rise at 192 which returns the tool into position to begin its work after indexing has been completed.

The rounding tool M² for acting on the lower ends of the gear teeth is supported, adjusted, driven, and shifted, by means identical with those hereinbefore described with respect to the tool M'. The only difference is that it is located at a different height, or position longitudinally of the work; but the capacity for longitudinal adjustment of both tools is such that either may be placed to act interchangeably on either end of the work. The upright slide which carries the tool M² is designated 193. It is located at an equal distance to the opposite side of shaft 169 from the slide 157, and it carries at its lower end a follower roll 194 bearing on a cam 195, like the cam 159, which is driven from shaft 169 by change gears 196 and 197, like the change gears 170 and 171, through a clutch 171A. As these two cams are both carried by the same rock lever 173 and are located at respectively opposite sides of the fulcrum of this lever, the tools are simultaneously moved in relatively opposite directions by the single back off cam 174 to clear the work during indexing. The rounding tool M² has its own separate driving motor 198.

It may be noted that, inasmuch as the organization here illustrated requires each work piece to turn through an angle somewhat in excess of two complete rotations while in their tooth generating locations, ample time is afforded for the work piece in the tooth rounding location to be acted on as to all of its teeth by both rounding tools, for a rotation of much less than two turns suffices to bring all of its teeth to both rounding tools and allow for the delay in advancing these tools from backed off position after completion of the indexing movement; and both tools may be caused by selection of cams of suitable outline, and suitable adjustment of such cams, to accommodate work gears of any tooth width and spacing, within limits.

The power means for driving the movable parts, and the control means for the various steps in the cycle of operation of the machine, are all electrical. This conduces greatly to accomplishment of my object of achieving the utmost simplicity in a necessarily complex organism.

The events of the cycle additional to those effected by the mechanisms already described are: (1) Starting and stopping the machine, manually performed; (2) releasing the turret lock and temporarily stopping or retarding the indexing motor before arrival of the turret in fully indexed position; (3) accelerating the rotation of the tooth generating cutters; and (4) stopping the machine on failure of proper coordination of the indexing means with the balance of the machine. The means for controlling these events will now be described with reference particularly to the diagrams in Figs. 25 and 26.

The starting and stopping control is a switch 199 in circuit with the main motors 43 and 44 through conductors a, b, interlock 200, and conductors c and d; and in circuit with the torque motor 137 through conductor e, interlock 201, time relay 202, and conductor f. The switch here shown is of the push button type with one button for starting and another for stopping. On pushing the starting button, the main motors are immediately set in operation, and the torque motor is energized, but does not move the turret until locking bolt 146 is withdrawn from the notch with which it may then be engaged. This locking bolt is provided with rack teeth on one side into which mesh the teeth of a pinion 203, having an arm which is coupled with the core of a normally inactive solenoid 204, as shown in Fig. 11, so that when the solenoid is energized the bolt is withdrawn from engagement with the turret, against the resistance of its forwardly thrusting spring 205. Except when the solenoid is energized, the spring presses the bolt into the adjacent socket in the side of the turret, or against the turret ready to slip into the socket which is next brought by the indexing movement into line with the bolt. This solenoid is in circuit with interlock 200, and is also in circuit through conductor b with an interlock 206 beside a timing cam 207 connected to the worm gear 87 which rotates the cutter spindle 34. The last named interlock and timing cam are shown not only in the diagrams, but also in most of the figures which illustrate structure. The circuit between interlock 200, solenoid 204 and interlock 206 is completed by a conductor h, interlock 208 and conductor i.

The term "interlock" as here used means an electrical contact which is opened or closed at certain times and which ties together the functions of two or more devices. The devices which I have used in this machine for that purpose are well known items of electrical equipment which are obtainable on the market and the use of which is well understood in the electrical arts. I have invented nothing new in such interlocks, but have applied commercial forms of interlock to my particular purpose. Therefore I conceive that description in detail of such devices is unnecessary for the disclosure of this invention, but that it is sufficient to explain the purposes which they serve and the manner in which they are combined with other features of the machine to accomplish these purposes.

Interlock 200 is equipped with a projecting stem or plunger 209 which is displaced by the outer end of bolt 146 when the bolt is withdrawn from the turret and while the latter rests on the side of the turret between the locking sockets thereof. Interlock 206 has a projecting stem or plunger 210 in position to be displaced by a fixed cam rise 211 of limited angular extent, and an adjustable cam element 212, both on the timing cam 207, these being the only motion causing parts of said cam. Similarly the interlocks 201 and 208 have stems or plungers 213 and 214 respectively, which are acted on by cam protuberances 215, 216, 217 and 218 on the sides of the turret, equal in number to the locking bolt sockets in the turret, and each being definitely related in position to one of such sockets.

The protuberance 211 of the timing cam is situated to operate the interlock 206 as soon as the generating cutters C' and C² have completed their tooth generating cycles. Thereupon solenoid 204 withdraws the locking bolt, and the torque motor 137 immediately begins to turn the turret. After the turret has turned slightly, (assuming that it starts from the position shown in Fig. 23 and rotates clockwise), the cam projection 215 displaces the plunger of interlock 208, which renders solenoid 204 inactive and allows the lock to be spring pressed against the blank side of the turret ready to slip into the next approaching socket. But shortly before such next socket reaches locking position, the next cam projection 216 acts on interlock 201 to break the circuit of the torque motor, whereupon the turret gradually comes to rest. But the same action of interlock 201 sets time relay 202 in action, which latter, after a time long enough for dissipation of the momentum of the turret, energizes the torque motor again, whereby the turret is brought to the next stopping position, wherein it is arrested by the spring projected bolt. Such retard of the turret is provided in order to avoid shock when it is arrested by the locking bolt. The machine here illustrated is large and the turret with its work spindles is massive and is rotated so rapidly that its abrupt stoppage by a rigid bolt would cause an injurious shock. But by allowing it thus to lose its momentum shortly before reaching the locking position (say ¼" or ½" short), its traverse through the remaining distance upon restarting the motor brings it to the locked condition gently and without shock. If the momentum of the turret could be relied on to bring it definitely up to the next locking position every time after the power of its indexing motor has been shut off, the time relay and its function could be omitted and the reactivation of this motor effected by projection of the locking bolt. Indeed the omission of this feature would not be a departure from the invention or the protection here claimed. But as the turret must be certainly advanced the full prescribed angle at each indexing step, I have provided the interlock and relay last described to ensure this result.

A safeguard to prevent damage to the cutters or other parts of the machine, and to the work, in case of accidental failure of the turret to reach locked position until after the cutters have been turned beyond the points at which they begin their cutting cycle, is provided in the adjustable cam element 212. This member is mounted on the timing cam at a distance from the fixed projection 211 proportional to the width of the gaps $g$ in the cutters, so that it pushes back the plunger of interlock 206 a second time. If at the same time the plunger of interlock 200 is pressed back (as it will be if the bolt 146 is held back by the side of the turret), then the circuits of the main motors 43, 44, and the torque motor 137 are broken, and the machine is stopped.

The gap $g$ may be longer in some cutters than in others. This will be the case if cutters for making gears of different diameters are equal in diameter to one another, or nearly so. The circumferential length of the toothed portion of the cutter is determined by the diameter of the work to be produced, and the balance of its circumference is blank. In the case of a relatively large cutter provided for generating relatively small gears, this blank space or gap may be a substantially large proportion of the entire circumference. In order then to avoid loss of time in completing the rotation of the cutter to position for commencing a new cutting cycle, I have provided means for speeding up the rotation of the cutter, under control of timing cam 207 and interlock 206, while its blank space or gap is beside the work piece location. To permit of such speeding up action, the overrunning clutch previously referred to in this specification is inserted between two parts of the shaft 80. Such a clutch is shown in Figs. 3 and 7 as consisting of a gear or sprocket 219 secured to the shaft 80, a gear or ratchet 220 secured to an alined but independently rotatable section 80a of this shaft (the section on which the change gear 79 is secured), and a pawl 221 carried by the sprocket 219. Such ratchet and pawl are arranged so that the drive through the gear 79 will rotate the shaft 80 positively, while this shaft may be rotated independently in the same direction at a higher speed. A separate electric motor 222, characterized for convenience of description as a fast speed motor, is directly coupled to the sprocket 219 by a chain or link belt 223 or the like. The windings of this motor are in circuit with the interlock 206, in such a mode of connection that when the plunger 210 of the interlock is displaced by cam projection 211, the motor is started at the same time that the turret lock is withdrawn, and when actuated again by the adjustable cam element 212 the fast speed motor is stopped. As previously noted, cam element 212 is adjustable to an angle with the fixed abutment 211 equal, or substantially so, to the angular extent of the gap $g$ in the cutter. Of course the speeding up action is given equally and at the same time to both cutters.

Many gears are made in integral clusters such, for instance, as those used in automobile transmissions. This machine is adaptable for cutting different units of such cluster gears, as well as for cutting single gears. Figs. 18–21 show an optional means for positioning the cutter to act on any one of a number of gears spaced apart from one another on the same axis. The pivot 54a of the spindle reciprocating segment is provided with eccentric trunnions 54b, which occupy bearings in the flanking webs of the cutter saddle, and the eccentricity is great enough to withdraw the gear segment entirely from the spindle rack teeth by a semi-rotation of the pivot. It may be thus rotated by a wrench applied to its protruding square end 54c. A pinion 224 is rotatably mounted in bearings in the side of the saddle and positioned to mesh with the rack teeth 56 on the spindle. The shaft of this pinion has an accessible square end 225 to which a wrench may be applied for turning the pinion to raise or lower the spindle when the operating segment has been withdrawn from mesh. This adjustment may be utilized in connection with lengthening or shortening of the connecting rod 51, or independently thereof. It affords a much wider range of adjustment than can be effected by changing the length of the connecting rod alone, and has a further advantage in that it involves no change in the angular position of the driving segment. To accommodate so wide a range of adjustment the machine base may be constructed (as shown in Fig. 18) to locate its guideways for the spindle carrying bed at a higher level with respect to the work spindle turret than that shown in Figs. 1–7; or spacers may be inserted between the lower part of the base and the upper part on which the guideways are formed. Both shaping cutter spindles of the machine are equipped with such adjusting means when plural-step gears are to be cut.

I wish to make it understood as definitely as possible that the foregoing specific description of the details of a particular machine is not to be construed as limiting my protection to such details, and that many variations and modifications in structure and arrangement of the parts and combinations of the machine may be made within the scope of the protection afforded by the appended claims.

What I claim and desire to secure by Letters Patent is:

1. A gear generating machine comprising a base, a plurality of cutter carrying beds mounted on said base with provisions for adjusting toward and away from one another, means for clamping said beds rigidly in their positions of adjustment, cutter spindles supported rotatably and reciprocatively, one in each of said beds, mechanism mounted in each bed for reciprocating the adjacent spindle, spindle rotating means associated with each of said spindles, a driving train mounted in one of said beds for operating the spindle rotating means thereof, and a transmission shaft driven by said train and having connection with the spindle rotating means of the other bed.

2. A gear generating machine comprising a base, a work carrying turret rotatably mounted on said base, work spindles mounted rotatably in said turret spaced apart from and around the axis of rotation thereof, cutter spindle carriers supported on said bed at opposite sides of a diametral plane of the turret with provisions for adjustment to different distances from said plane, cutter spindles reciprocatively and rotatably mounted in the respective carriers, a spindle reciprocating mechanism associated with each carrier to reciprocate the spindle thereof, spindle rotating means associated with each cutter spindle, a driving train for one of said spindle rotating means, and a transmission connection between the two spindle rotating means having a sliding connection with one of them to permit the before mentioned adjustment of the carriers.

3. In a gear generating machine, a plurality of gear shaper cutters each having teeth occupying less than the whole pitch circumference of the cutter and a gap at one side devoid of teeth, the number of such teeth being a multiple of the number of teeth to be cut in the work pieces and being arranged in series of which the second series are designed to cut the work additionally to the teeth of the preceding series, a turret rotatably mounted with its axis at an intermediate point between the cutter axes, a plurality of work spindles, adapted to carry gear blanks, rotatably mounted in said turret at such distances from the turret axis and from one another as to cause each spindle to be brought in turn, by rotation of the turret, into operative relationship with each cutter, means for rotating the cutter and work spindles in harmony for the generation of gears, and timing means organized to rotate the turret while the toothless gaps of the cutter are tangent to the spindle orbit and to cause pausing of the spindles in their working positions long enough to be acted on by all of the cutter teeth.

4. A gear generating machine comprising a reciprocative and rotatable cutter having a toothless gap at one side, means for placing successively a series of rotatable work spindles in working location adjacent to the cutter, and timing means for causing the shifting of work spindles into and out of working location to occur while the gap in the cutter is tangent to the path in which the work spindles travel.

5. A multiple gear generating machine comprising a reciprocative and rotatable gear shaper cutter having a toothless gap at one side, a series of rotatable work spindles adapted to hold gear blanks, means for shifting said spindles so as to place them successively in working location beside the cutter, means for rotating the cutter and spindle in working location harmoniously for the generation of gear teeth in the blank carried by the spindle, and timing means organized to cause shifting of the spindles into and out of location while the gap side of the cutter is toward the orbit of the spindles and to leave each spindle in such location while all the cutter teeth act on the gear blank.

6. A gear shaping machine as set forth in claim 5, combined with means for accelerating the rotation of the cutter, under control of the timing means, after placement of each spindle in working location and until the first cutter tooth following the gap has arrived approximately in intersecting relationship to the work piece.

7. A gear generating machine comprising a gear shaping cutter, a spindle carrying said cutter, a plurality of work spindles, a turret in which said work spindles are rotatably mounted and which is rotatable to bring the spindles successively into working location adjacent to said cutter, means for rotating said cutter and spindles in generative harmony with one another, torque applying means engaged with the turret tending constantly to rotate it, a lock normally preventing rotation of the turret, and timing means connected with the cutter spindle organized to cause unlocking of the turret lock when the cutter spindle has reached a given point in its rotation.

8. A multiple spindle machine tool comprising a turret, a plurality of spindles mounted in said turret, an electric torque motor normally energized during the operation of the machine and geared to said turret so as to tend constantly to rotate it, a lock engaging said turret to prevent its rotation, electrically controlled means for withdrawing said lock to release the turret, and means for temporarily deenergizing the torque motor shortly before the turret reaches the second stopping position, whereby to bring the turret into engagement with said locking means at such second stopping position without shock.

9. In a multiple spindle machine tool, a turret having a plurality of arresting abutments, an electric torque motor geared to said turret and normally energized during the operation of the machine whereby it tends constantly to rotate the turret, a bolt normally arranged in the path of said abutments for arresting the turret by engagement with one or another thereof, timing means adapted to operate continuously during the cycle of the machine, and electrical control means governed by said timing means; the control means having provisions for withdrawing the bolt from an engaged abutment and then permitting its return into position for engaging another abutment, and means controlled by the turret for deenergizing the torque motor shortly before such other abutment reaches the bolt, and thereafter making the torque motor again active so as to bring the other abutment gently into arresting contact with the bolt.

10. A gear generating machine comprising a gear shaped planing cutter having a toothless gap at one side, means for reciprocating and rotating said cutter for generation of teeth in a gear blank located in meshing relationship with such cutter, a work carrying turret rotatably mounted in the machine, work spindles mounted on said turret so as to be placed successively by rotation of the turret into operating relationship with the cutter, indexing means for the turret, and timing means associated with the cutter and organized to cause operation of such indexing means when the toothless side of the cutter is adjacent to the operative location of the work spindles.

11. A gear generating machine as set forth in claim 10 and comprising further means for accelerating the rotation of the cutter, said timing means being organized to effect such acceleration after indexing of the turret and for a time sufficient to bring the first tooth of the cutter following the toothless gap thereof approximately into cutting position with respect to the work piece then in position to be operated on.

12. A gear generating machine comprising a rotatable cutter spindle, a rotatable turret, a plurality of work spindles carried by said turret and movable by rotation thereof successively into operative relationship with the cutter spindle, a timing cam associated with the cutter spindle for movement at a rate in proportion to the rotation of said spindle, cam elements carried by the turret, each related to one of the work spindles, indexing means for the turret, and electrical means under control of said timing cam and turret cam elements for controlling the operation of said indexing means.

13. A gear generating machine as set forth in claim 12, and comprising further a torque motor geared to the turret for imparting rotation thereto, a locking bolt engageable with abutments on the turret for arresting the latter in its several indexed positions, control means operated by the timing cam for disengaging said locking bolt from the turret, and other control means operated by the cam elements of the turret for restoring the bolt into potential locking position after the commencement of indexing rotation of the turret and prior to the completion of one step of such rotation.

14. A gear generating machine as set forth in claim 12, and comprising further a torque motor geared to the turret for imparting rotation thereto, a locking bolt engageable with abutments on the turret for arresting the latter in its several indexed positions, control means operated by the timing cam for disengaging said locking bolt from the turret, other control means operated by the cam elements of the turret for restoring the bolt into potential locking position after the commencement of indexing rotation of the turret and prior to the completion of one step of such rotation, and a further control means also operated by the turret cam elements for interrupting the action of said torque motor shortly prior to the completion of a step of the turret indexing rotation.

15. A gear generating machine comprising a reciprocative and rotatable gear shaped planing cutter having a toothless gap at one side, a plurality of work spindles, a rotatable turret carrying said spindles and movable to bring them in turn into a working station beside the cutter, means for reciprocating and rotating the cutter, indexing means for the turret, a timing means movable in harmony with the rotation of the cutter, and a series of control means operated by the timing member and turret for indexing the turret when the toothless gap of the cutter is beside the working position of the work spindles and for stopping the reciprocation of the cutter when the turret fails to complete an indexing step during the time that the gap of the cutter remains beside such station.

16. A gear generating machine comprising a cutter spindle, a plurality of work spindles, a turret supporting said work spindles rotatably and being itself rotatable to carry the spindles in turn into working location beside the cutter spindle, a tooth rounding tool adjacent to a stopping location to which the spindles are brought after passing from such working location, said tooth rounding tool being provided with teeth arranged to engage the ends of teeth previously formed on a gear blank carried by the work spindle and being of such dimensions as to be capable of entering between such gear teeth, correlated means for rotating the work spindles in unison and for rotating the cutter spindle in harmony therewith, means for rotating the rounding tool, and means for displacing the rounding tool lengthwise of the gear into and out of an interdental space of the gear in the time during which the gear rotates through the angle between two adjacent teeth.

17. A gear generating machine as set forth in claim 16, comprising further means for indexing the turret, and means for displacing the rounding tool clear of the work while the turret is being indexed.

18. In a machine of the character specified, a reciprocative slide, a gear tooth rounding tool carried by said slide, a cam engaged with the slide and operated to reciprocate it, a lever by which said cam is carried, and means for moving said lever from time to time so as to displace the cam and thereby shift the slide out of its range of normal movement.

19. In a gear generating machine, a reciprocative and rotatable cutter spindle, a gear shaper cutter carried by said spindle, rack and pinion gearing including an oscillatable gear segment, for reciprocating said spindle, and a displaceable pivot for said gear segment, shiftable to move the segment into and out of mesh with the rack element of said gearing, whereby to permit endwise displacement of the spindle and reengagement with the gear segment in a different position.

20. In a machine tool, a reciprocative spindle having associated rack teeth, a gear segment in mesh with said teeth, a pivot supporting said segment in position to effect reciprocation of the spindle by its own oscillations, means for displacing said pivot far enough to shift the gear segment out of mesh with said rack teeth, and a pinion in mesh with the rack teeth and operable to effect an endwise displacement of the spindle while the said gear segment is out of mesh therewith.

21. In a gear shaping machine, a reciprocative and rotatable cutter spindle, means for reciprocating said spindle, and means for disengaging said reciprocating means therefrom, shifting the spindle endwise, and reengaging the reciprocation-causing means with it, whereby to operate the cutter which is carried by the spindle in a different zone lengthwise of the spindle axis.

22. A gear generating machine comprising a work spindle, a work spindle carrier movable to shift such work spindle into and out of different working locations, at tooth generating cutter adjacent to one of such locations, a cutter for rounding the ends of the generated gear teeth adjacent to another of said locations, automatic means for operating each cutter while the work spindle pauses in the respective working locations adjacent to such cutter, cooperating means for bringing the teeth generated on a work piece carried by said spindle when in the first-mentioned location into correct position with respect to the rounding cutter to be rounded on their ends by the latter, when the work spindle is in the second-mentioned location, and means for displacing the tooth rounding cutter clear of the workpiece when the latter passes into and out of working location adjacent to said rounding tool.

23. A gear generating machine comprising a gear shaped planing cutter having a gap devoid of teeth at one side, means for reciprocating and rotating said cutter for generation of teeth in a gear blank located in meshing relationship with the cutter, a work spindle adapted to support and rotate a gear blank, a displaceable carrier for said spindle operable to place the latter in and out of a position wherein its work piece occupies such meshing relationship with the cutter, timing means correlated with the cutter and spindle carrier organized to effect such shifts of the carrier while the toothless gap of the cutter is beside the operative location of the work spindle, and means for imparting an accelerated movement of rotation to the cutter; the timing means being organized to put said accelerating means into action directly following the placement of the work spindle in said location.

24. A gear generating machine comprising a plurality of work spindles adapted to rotate about their own axes and to revolve about a common axis, means for shifting said spindles around the last named axis and placing them successively in different working locations, gear shaping cutters, each having a gap devoid of teeth at one side wide enough to permit passage of gear blanks carried by said spindles when shifted around said common axis, said cutters being mounted adjacent to two of said working positions, means for reciprocating said cutters axially, means for rotating the cutters and work spindles about their respective axes at rates in harmony with one another for the generation of gear teeth in blanks carried by the respective spindles, and timing means for causing the shift of the work spindles to occur when the toothless gaps of the cutter are next to the orbit of the work spindles.

25. A gear generating machine comprising the combination of a cutter spindle and a plurality of work spindles, said spindles being rotatable about their respective axes at speeds in harmony with one another for the generation of gear teeth in a blank, and the work spindles being mounted with provision for displacement successively into and out of working position adjacent to the cutter spindle, a gear shaper cutter on the cutter spindle having a toothless gap at one side wide enough to permit passage of work pieces into and out of working position when turned toward the path in which the work spindles are thus displaced, means for effecting relative reciprocation lengthwise of the cutter spindle between such spindle and the work spindle in working location, and timing means for causing the displacement of the work spindles to occur when the gap in the cutter is turned toward the displacement path of the work spindles.

26. A gear generating machine comprising a revolubly mounted turret, a plurality of work spindles mounted rotatably in said turret constructed and arranged to independently support work pieces equidistant from the turret axis and equiangularly spaced around such axis, means for rotating the turret and stopping it at points which bring the work spindles in turn successively to each of a plurality of working locations, rotatable and reciprocative cutter spindles mounted in cooperative relation to two of such working locations, a gear shaper cutter carried by each of said spindles, each cutter having two series of teeth adapted to make successive cuts in the same parts of the work pieces on each work piece in turn, and means for rotating the cutter spindles and work spindles simultaneously at speeds in harmony with one another for the generation of gears.

27. A gear shaping machine comprising roughing and finishing cutters, each having peripheral teeth similar to gear teeth with a cutting edge at one end, and the teeth of each cutter being arranged in two series, of which the teeth of the second series are formed to remove stock from the sides of the work piece teeth left by the teeth of the preceding series, means for operating said cutters simultaneously in different stations, a series of work spindles each adapted to support and rotate a work piece, means for holding two of such spindles in positions adjacent to the respective cutters, and means for shifting the work spindles alternately from one cutter to the other, whereby the gears are rough cut in two steps by the first cutter and finished in two steps by the second cutter.

28. A gear generating machine comprising a base, a turret rotatably supported by said base, beds mounted on said base and adjustable independently in lines radial to the axis of said turret, a rotatable and axially reciprocative cutter spindle mounted in each bed and adapted to carry a gear shaper cutter, means for rigidly clamping said beds in their respective positions, and a plurality of work spindles mounted rotatably in said turret and adapted to be brought by rotation of the turret into operating positions adjacent to each cutter spindle in turn, and means for simultaneously rotating the cutter and work spindles and reciprocating the cutter spindles while the work spindles are in such working positions.

29. A gear generating machine comprising a base, a turret rotatably mounted in said base, a plurality of work spindles rotatably mounted in the turret and adapted to be brought into different working locations by rotation of the turret, cutter spindles beside two of such working locations of the work spindles, gear shaper cutters carried by each of said cutter spindles and each having cutting teeth similar in outline to gear teeth, said cutting teeth being arranged in two series each occupying not more than half of the circumference of the cutter, and the second series being formed to remove stock left on the work piece by the teeth of the preceding set, one of said cutters being formed to cut material left on the work pieces by the second series of teeth of the first cutter, means for simultaneously rotating the cutter spindles and the work spindles in each working location, and means for reciprocating the cutter spindles.

30. A gear generating machine comprising a base, a turret rotatably mounted in said base, work spindles rotatably mounted in said turret and adapted to be carried by rotation of the latter into different working positions, driving means geared to all of said spindles for rotating them in unison, said driving means being constructed for continuous connection with the spindles in all positions of the latter and during their traverse from one position to the other, operating tools mounted adjacent to different working locations of the work spindles, operating means for said tools, indexing means for the turret, and timing means for correlating the movements of the turret with a cycle of operations of the tools.

31. A gear shaping machine comprising the combination with two rotatable and reciprocative cutter spindles and gear-like planing cutters carried thereby, of a turret mounted to rotate about an axis substantially equidistant from both cutter spindles, work spindles rotatably carried by the turret and adapted to be brought by rotation thereof successively into working positions adjacent to each cutter in turn, driving means in continuous rotation-transmitting connection with said spindles for rotating them in said working positions and maintaining them in condition to mesh with one cutter after having first been cut by the other cutter, and means for periodically indexing the turret.

32. A gear generating machine comprising two parallel reciprocative and rotatable cutter spindles, gear shaper cutters mounted on said spindles, means for reciprocating and continuously rotating said spindles, a turret mounted to rotate on an axis substantially midway between the cutter spindle axes, a plurality of work spindles rotatably mounted in said turret equidistant from, and spaced equiangularly about, the axis thereof, means for periodically rotating the turret through angles equal to the angular spacing of the work spindles and locating the work spindles successively in working positions adjacent to each of the cutter spindles in turn, and driving mechanism in simultaneous and continuous rotation-transmitting connection with all of the work spindles for rotating them harmoniously with the cutter spindles in each working location and during their transit from one location to the other.

33. A gear generating machine comprising a rotatable cutter spindle, a gear shaper cutter carried by said spindle, a plurality of work spindles, a turret in which said work spindles are rotatably mounted and which is rotatable to bring the spindles successively into working location adjacent to said cutter, means for rotating the cutter spindle and work spindles in harmony with one another, turret indexing means, a cam coupled with the cutter spindle and rotating in unison therewith, and control means for said indexing means operable by said cam at a given point in the rotation of the cutter spindle to cause substitution of one work spindle for another in the working location.

34. A gear generating machine comprising a rotatable turret, a plurality of work spindles rotatably mounted in the turret equidistant from and equiangularly spaced about the axis of the turret, means for periodically indexing the turret and stopping it with the spindles in turn in each of two working locations, a cutter spindle reciprocatively and rotatably mounted beside that one of the working locations in which the cutter spindles are first placed, a rounding tool carrier reciprocatively mounted beside the second working location, a tooth rounding tool mounted on said carrier in position to bevel the ends of teeth generated in the work pieces at the first working location, means for simultaneously rotating the work spindles in both working locations, and means for giving a back and forth reciprocation to the rounding tool carrier while the work spindle turns through the angle between two adjacent teeth of the work piece carried thereby.

35. A gear shaping machine as set forth in claim 34 and comprising further means organized and arranged to place and hold said carrier in a position where the rounding tool is clear of the work pieces during the transit of work spindles into and out of the second working location.

36. In a machine of the character described, the combination with a rotatable work spindle turret, work spindles rotatably mounted in said turret, and means for indexing said turret to place the work spindles successively in a given working location, of a rounding tool carrier mounted to reciprocate adjacent to such working location, a tooth rounding tool mounted on said carrier and arranged to bevel the ends of teeth of gears carried by the work spindles, an oscillative lever, carrier driving means mounted on said lever and engaged with said carrier for reciprocating it, means for moving said lever, and therewith the carrier reciprocating means, to displace the carrier additionally to its normal reciprocating movements, and correlated driving means for simultaneously rotating the work spindle in working location and driving the carrier-reciprocating and lever shifting means.

37. In a gear shaping machine having cutter and work spindles, one of which is reciprocative axially for effecting the cutting of gears with a planing cut, a saddle holding one of said spindles and being shiftable to effect a relative separation between cutter and work during non-cutting strokes and return them into relative cutting positions, and stop means for arresting the saddle in cutting position; a cam for advancing the saddle to its arrested position, and transmitting means between the cam and saddle including a torque member adapted to yield under continued throw of the cam after the saddle has reached its arrested position.

38. In a gear shaping machine having cutter and work spindles, one of which is reciprocative axially for effecting the cutting of gears with a planing cut, a saddle holding one of said spindles and being shiftable to effect a relative separation between cutter and work during non-cutting strokes and return them into relative cutting positions, and stop means for arresting the saddle in cutting positions; a cam, and transmission mechanism between said cam and saddle organized to transmit force from the cam to the saddle in the direction to advance the latter into its arrested cutting position, said transmission mechanism including a torque shaft having force-receiving and force-delivering attachments connected to it at longitudinally separated points, whereby the shaft is adapted to serve as a torsion spring.

39. In a gear shaping machine having cutter and work spindles, one of which is reciprocative axially for effecting the cutting of gears with a planing cut, a saddle holding one of said spindles and being shiftable to effect a relative separation between cutter and work during non-cutting strokes and return them into relative cutting positions, and stop means for arresting the saddle in cutting position; a cam for advancing the saddle into its cutting position and transmission means between the cam and saddle including two pivotally mounted arms, one of which receives thrust from the cam and the other transmits thrust to the saddle, and resilient torque transmitting means between the two arms.

40. In a gear shaping machine having cutter and work spindles, one of which is reciprocative axially for effecting the cutting of gears with a planing cut, a saddle holding one of said spindles and being shiftable to effect a relative separation between cutter and work during non-cutting strokes and return them into relative cutting positions, and stop means for arresting the saddle in cutting position; a cam for advancing the saddle to its cutting position, and transmission means between the cam and saddle comprising a torque shaft, an arm secured to said torque shaft in position to receive thrust from the cam, and a second arm coupled to the torque shaft at a point thereon axially removed from the first arm and coupled with the saddle so as to apply force in the desired direction thereto.

41. In a gear shaping machine as set forth in claim 40, means for adjusting one of said coupled connections to regulate the time at which the saddle reaches its arrested position with reference to the time at which the maximum displacement of the cam is brought into play.

42. In a gear shaping machine as set forth in claim 40, means for adjusting one of said arms with respect to the torque shaft so as to alter the time lag between arrest of the saddle and exertion by the cam of its maximum displacing effect.

43. In a gear producing machine, a rotatable work spindle adapted to support a gear, a rounding tool holder, a guideway in which said holder is mounted for reciprocating movement adjacent to the work spindle, a rounding tool projecting from said holder, having cutting teeth at its protruding end and being shaped and located to permit entrance of such end into the spaces between the teeth of a gear mounted on the work spindle, and to withdraw from such spaces, a spring reacting between said holder and guideway tending to move the holder in one direction, a cam engaging said holder in position to limit the spring caused movement of the holder and being constructed to move the holder oppositely to such spring caused movement, and driving mechanism for simultaneously rotating the work spindle and cam at relative speeds such that the tool holder is caused to enter and withdraw from each interdental space of the gear while the gear rotates through the angular spacing between two successive teeth.

44. The combination set forth in claim 43 and including an adjustable cam abutment on the tool holder in contact with said cam arranged for operation to shift the limits of the path of movement of the holder.

45. The combination set forth in claim 43 and including further a carrier by which said cam is supported, which carrier is movable to shift the cam bodily in the directions of reciprocation of the tool holder, and mechanism correlated with the previously named operating mechanism for so moving said carrier as to withdraw the rounding tool from the gear.

46. A gear generating machine comprising a turret, a plurality of work spindles supported rotatably in said turret, means for periodically indexing said turret and arresting it with two of said spindles in two definite working stations, driving mechanism coupled with said spindles for rotating them in unison, a gear generating cutter located beside one of said stations in position to generate teeth in a gear blank carried by the spindle at that station, a rounding tool located beside a working station to which the spindles are brought after leaving the last named station, said rounding tool having teeth formed and located to enter spaces between the previously generated teeth of the work gear, means for imparting cutting movement to the rounding tool, and correlated mechanism for simultaneously rotating the cutter and displacing the rounding tool reciprocatively in correct harmony with the spindle rotation for respectively generating teeth in a gear blank at the first named station and rounding the ends of the teeth of a gear in the second named station.

EDWARD W. MILLER.